United States Patent
Mola et al.

(10) Patent No.: US 8,899,838 B2
(45) Date of Patent: Dec. 2, 2014

(54) BALL RETAINING CAGE FOR BEARINGS AND A DEEP GROOVE BALL BEARING

(75) Inventors: Roberto Mola, Turin (IT); Riccardo Restivo, Turin (IT); Gianpiero Scaltriti, Turin (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/996,043

(22) PCT Filed: Dec. 20, 2011

(86) PCT No.: PCT/IB2011/055817
§ 371 (c)(1),
(2), (4) Date: Jun. 20, 2013

(87) PCT Pub. No.: WO2012/085842
PCT Pub. Date: Jun. 28, 2012

(65) Prior Publication Data
US 2013/0272638 A1    Oct. 17, 2013

(30) Foreign Application Priority Data
Dec. 21, 2010   (IT) .............................. TO2010A1029

(51) Int. Cl.
| | |
|---|---|
| F16C 33/38 | (2006.01) |
| F16C 33/66 | (2006.01) |
| F16C 33/58 | (2006.01) |
| F16C 33/78 | (2006.01) |
| F16C 33/80 | (2006.01) |
| F16C 19/06 | (2006.01) |

(52) U.S. Cl.
CPC ............. *F16C 33/38* (2013.01); *F16C 33/6614* (2013.01); *F16C 19/06* (2013.01); *F16C 33/583* (2013.01); *F16C 33/7893* (2013.01); *F16C 33/3875* (2013.01); *F16C 33/6618* (2013.01); *F16C 33/6629* (2013.01); *F16C 33/80* (2013.01)

USPC .......................................... 384/526; 384/530

(58) Field of Classification Search
USPC .................................. 384/523, 526, 528–530
See application file for complete search history.

(56) References Cited

U.S. PATENT DOCUMENTS

| | | | | |
|---|---|---|---|---|
| 2,861,849 | A | * | 11/1958 | Case ............................ 384/527 |
| 3,450,449 | A | | 6/1969 | Sibley |
| 3,586,405 | A | * | 6/1971 | Claesson ....................... 384/526 |
| 3,743,369 | A | | 7/1973 | Langstrom |
| 4,626,113 | A | * | 12/1986 | Forknall et al. ............... 384/530 |
| 4,902,145 | A | * | 2/1990 | Johnson ........................ 384/530 |
| 5,069,560 | A | * | 12/1991 | Niedermeier et al. ........ 384/486 |

FOREIGN PATENT DOCUMENTS

| | | | |
|---|---|---|---|
| AT | 265762 B | | 10/1968 |
| AT | 382217 B | | 1/1987 |
| DE | AT 226017 B | * | 2/1963 |
| DE | 1914884 U | | 4/1965 |

(Continued)

*Primary Examiner* — Phillip A Johnson
(74) *Attorney, Agent, or Firm* — Bryan Peckjian; SKF USA Inc. Patent Department

(57) ABSTRACT

A cage for a ball bearing unit comprises two half-cages (51, 52) which are connected to each other and are symmetrical about a mid-plane (P) of the bearing. Each half-cage has an annular body (53) providing two concentric and circumferentially continuous radial ridges (56, 57) extending radially in opposite directions, of which the first ridge (56) extends in a radially outward direction for sealingly engaging a groove (25) formed in the outer ring of the bearing unit, and the second ridge (57) extends in a radially inward direction for sealingly engaging a groove (35) formed in the inner ring of the bearing unit.

17 Claims, 2 Drawing Sheets

(56) References Cited

FOREIGN PATENT DOCUMENTS

| | | |
|---|---|---|
| DE | 7018423 U | 10/1970 |
| DE | 102006036006 A1 | 7/2008 |
| EP | 0142669 A2 | 5/1985 |
| EP | 0644343 A1 | 3/1995 |
| EP | 1010909 A1 | 6/2000 |
| EP | 1762734 A1 * | 3/2007 |
| FR | 2134913 A5 | 12/1972 |
| JP | 2007040383 A | 2/2007 |
| JP | 2012013094 A * | 1/2012 |
| WO | WO 2008029737 A1 * | 3/2008 |
| WO | WO 2010150707 A1 * | 12/2010 |

* cited by examiner

BALL RETAINING CAGE FOR BEARINGS AND A DEEP GROOVE BALL BEARING

CROSS-REFERENCE

This application is the U.S. National Stage of International Application No. PCT/IB2011/055817 filed on Dec. 20, 2011, which claims priority to Italian patent application no. TO2010A001029 filed on Dec. 21, 2010.

TECHNICAL FIELD

The present invention relates to a ball retaining cage for ball bearings. The invention also relates to a deep groove ball bearing, known by the acronym DGBB in this field.

BACKGROUND ART

There are known bearing units which include a ball retaining cage composed of two symmetrical half-cages coupled together, wherein each half-cage has means for mutual connection with the opposite half-cage, and provides a plurality of partially hemispherical cavities which axially face the hemispherical cavities of the opposite half-cage so as to form, together with the latter cavities, the ball retaining pockets.

SUMMARY OF THE INVENTION

A general object of the invention is to provide a cage and a bearing, of the type mentioned above, which makes the assembly procedure simpler and more economical. Another object of the invention is to improve the sealing and the distribution of lubricating grease inside the bearing unit.

These and other objects and advantages, which will be made clearer below, are achieved according to the present invention by a cage as defined in Claim 1. According to another aspect of the invention, a bearing unit as defined in Claim 14 is provided. Preferred embodiments of the invention are defined in the dependent claims, the content of which is to be considered as an integral part of the present description.

BRIEF DESCRIPTION OF THE DRAWINGS

A preferred, but non-limiting, embodiment of the invention will now be described, with reference to the attached drawings, in which.

DETAILED DESCRIPTION OF THE INVENTION

Figure 1:
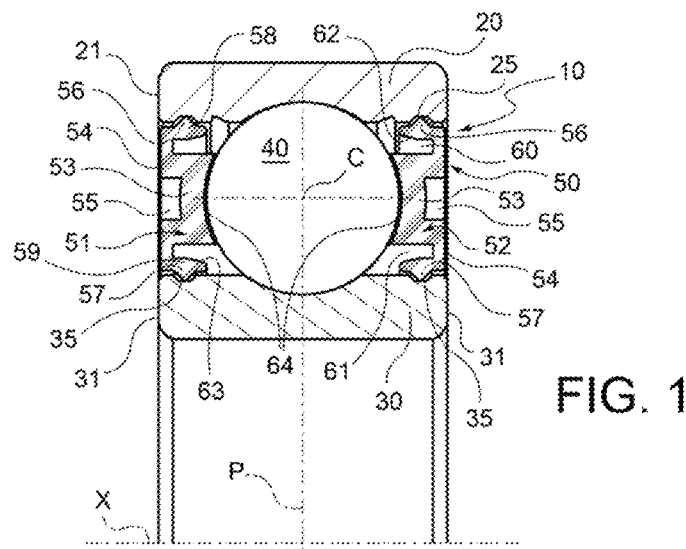
FIG. 1 is a partial view in axial section of a bearing unit including a cage according to an embodiment of the invention.

Before the detailed description of an embodiment of the invention is given, it must be emphasized that the invention is not limited in its application to the details and the configuration of the components cited in the description or illustrated in the drawings. The invention can be applied in various ways. The phraseology and terminology used herein for purely descriptive purposes are not to be considered as limiting. The use of the terms "include", "comprise", "form" and variants thereof covers not only the elements to which these terms relate but also any equivalents of these elements.

With reference initially to FIG. 1, a ball bearing unit, designated as a whole at 10, comprises a fixed outer ring 20, an inner ring 30 which is rotatable about an axis of rotation x, a set of balls 40 interposed between the outer and inner rings, and a ball retaining cage 50. The bearing unit 10 is a deep groove ball bearing unit (DGBB).

The cage 50 is composed of two half-cages 51, 52 connected to each other, the cages being advantageously identical to each other and being positioned in a substantially symmetrical way with respect to a radial mid-plane P passing through the bearing, on which plane the centres C of the balls 40 lie. The half-cages are preferably made of plastic material, such as PA 66 (polyamide 66) or polyhexamethylene diamide, which are already used for manufacturing retaining cages because of their properties of wear-resistance even with heavy use, low coefficient of friction, formability and resistance to ageing. As an alternative to a plastic material, a metal such as steel may be used.

Because of the symmetry of the half-cages, the following description will refer almost exclusively to one of the two half-cages, with the proviso that the part which is not described is to be considered identical or substantially identical to that which is described. Each half-cage comprises a basic annular body 53 having one side defined herein as the axially outer side, with reference to the position assumed by the cage in use in the bearing unit in the fully assembled condition. Each half-cage is delimited, on its axially outer side, by a flat radial surface 54 which, in use, is preferably placed flush with the respective lateral face 21, 31 of the outer and inner rings. An annular groove 55 is formed in a practically central position in the axially outer side of the half-cages, in order to increase the flexibility of the half-cage further and to facilitate its mounting on the bearing, as explained below.

Throughout the present description and the claims, any terms and expressions indicating positions and directions, such as "radial" and "axial", are to be understood as referring to the axis of rotation x of the bearing unit.

Figures 2, 2A, 2B:
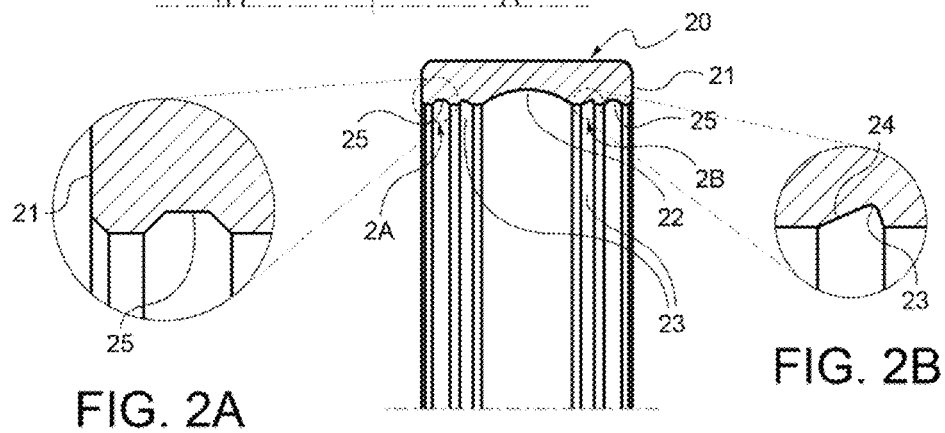
FIG. 2 is a partial view in axial section of the outer ring of the bearing unit of FIG. 1.
FIGS. 2A and 2B are enlarged views of two details indicated by 2A and 2B in FIG. 2.

On its radially inner surface, the outer ring 20 has a central ball race 22 and, on each side of the latter, a corresponding intermediate annular groove 23 having a conical surface 24 (FIG. 2B) diverging in an axially outward direction, and a lateral annular groove 25, preferably of trapezoidal shape (FIG. 2A), located closer to the axially outer side of the bearing.

Figures 3, 3A:
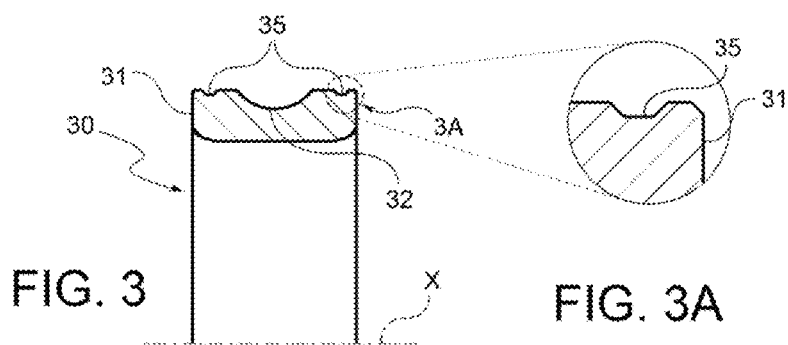
FIG. 3 is a partial view in axial section of the inner ring of the bearing unit of FIG. 1.
FIG. 3A is an enlarged view of the detail indicated by 3A in FIG. 3.
Figure 5:
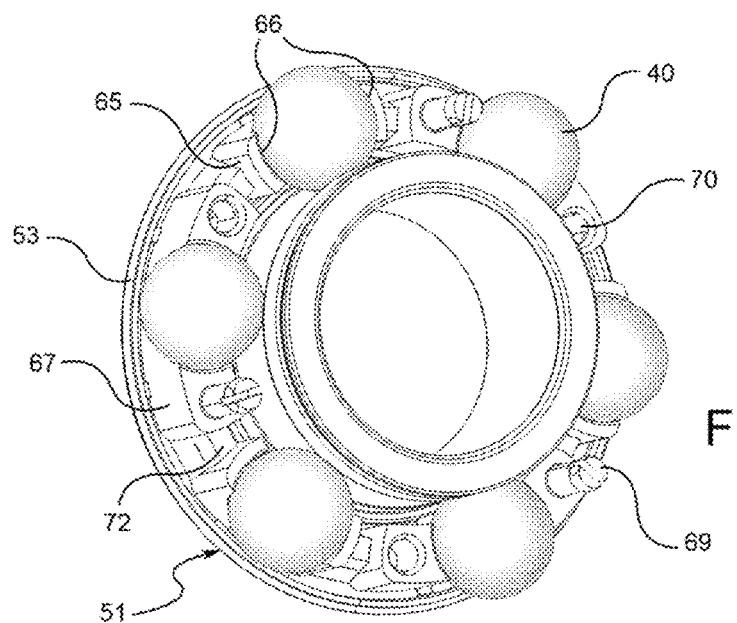
FIG. 5 is a perspective view of the assembly shown in FIG. 4, from which part of the cage has been removed.

The lateral annular grooves 25 are each radially aligned with a respective lateral annular groove 35 formed in the radially outer surface of the inner ring, on each side of the inner ball race 32 (FIGS. 3 and 3A).

Each half-cage has two radial ridges which are substantially concentric and circumferentially continuous, of which the first ridge projects in a radially outward direction 56 and engaging the lateral groove 25 formed in the outer ring while providing a labyrinth sealing action, and the second ridge 57 projects in a radially inward direction and sealingly engaging the lateral groove 35 formed in the inner ring. Each of the ridges 56 and 57 extends from a respective edge 58, 59, which projects in an axially inward direction from the radially outer periphery and from the radially inner periphery, respectively, of the annular body 53. This configuration imparts greater flexibility to the edges 58, 59, enabling the two half-cages to be snap-fitted into the respective mounting grooves 25, 35.

From the axially inner side, the half-cages have annular receptacles 60, 61 which open towards the balls. The function of the receptacles 60, 61 is to serve as reservoirs for the temporary accumulation of lubricant grease. The receptacles open towards the balls with respective conical surfaces 62, 63 diverging towards the ball race, to promote the redistribution of the lubricant grease towards the ball race and towards the intermediate grooves 23.

On its axially inner side, in other words on the side which faces the balls in use, the basic annular body 53 of each half-cage provides a plurality of partially hemispherical cavities 64, each formed by a pair of axial projections 65 having respective concave surfaces 66 lying on the same ideal spherical surface and substantially facing each other in pairs. The hemispherical seats of the two half-cages face each other in the axial direction in the assembled condition, and in combination define a plurality of partially spherical pockets for retaining the balls 40 at equal circumferential intervals between the races 22, 32 of the bearing rings. Each pocket is part of a respective spherical surface having its centre C lying on the radial mid-plane P.

Additionally, a plurality of axial connecting projections 67 extends from the axially inner side of the basic annular body 53 of each half-cage, these projections being placed alternately with the pairs of axial projections 65. The connecting projections 67 each have a partially hemispherical concave seat adapted to form a pocket for retaining a corresponding ball in the assembled condition. On both sides of the concave seat 68, with respect to the circumferential direction, each connecting projection has a mutual connection means for connection to the opposite half-cage. In the particular embodiment illustrated, the mutual connecting means are formed by pins 69 projecting axially and corresponding recesses 70 in which the pins 69 can advantageously be snap-locked. In the illustrated example, the pins 69 are bifurcated elastically.

Figure 4:
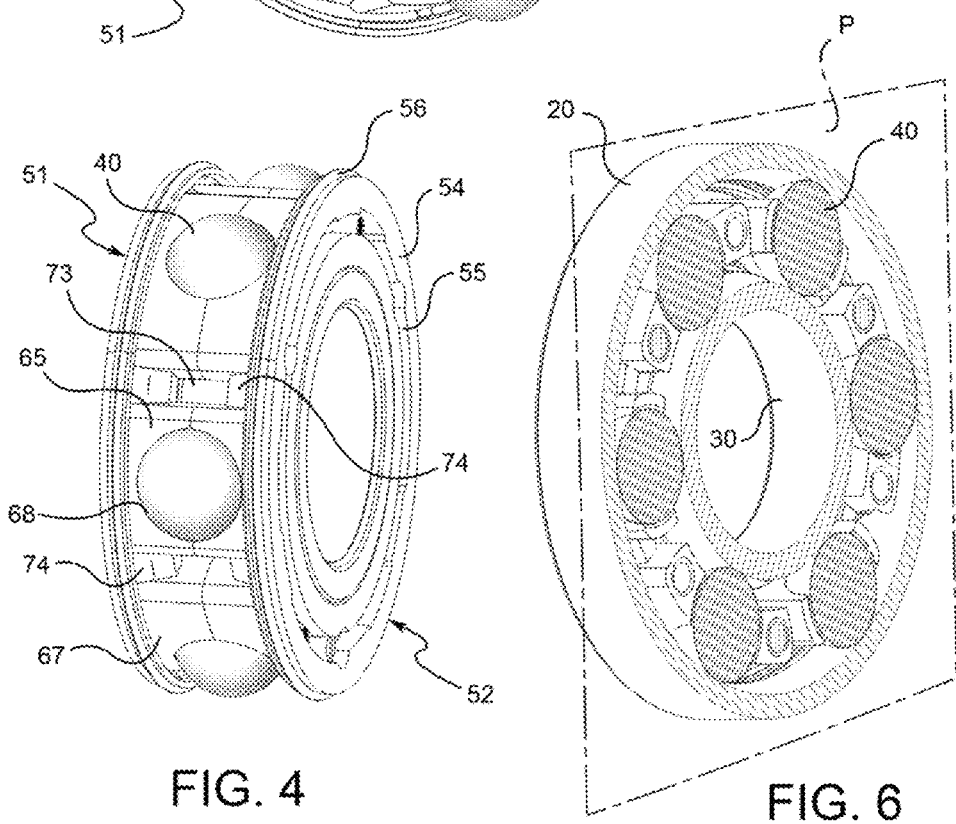
FIG. 4 is a perspective view of the bearing unit of FIG. 1, from which the outer ring has been removed for purposes of illustration.
Figure 6:
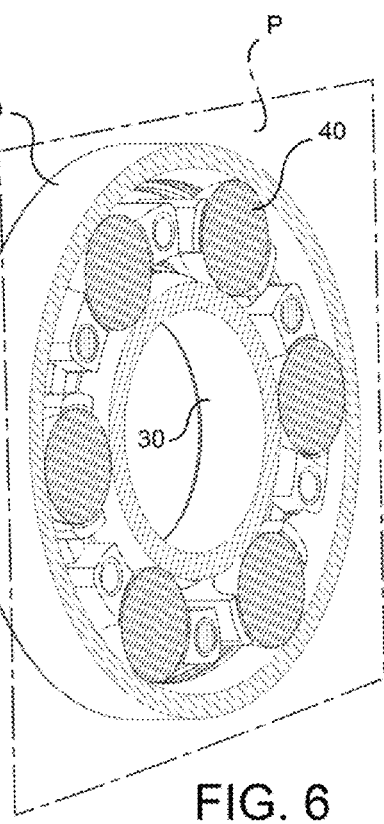
FIG. 6 is a perspective view in section, taken along a radial plane, of the bearing unit of FIG. 1.

As shown in FIG. 4, in the assembled condition the axial end surfaces of the projections 65 and 67 are in contact with each other and lie in the radial mid-plane P of the bearing.

Each half-cage has a portion 72 between two projections 65 and 67 which are consecutive in the circumferential direction, the portion 72 extending axially from the axially inner side of the basic annular body of the half-cage for a distance which is smaller than the axial extension of the projections 65 and 67. The portions 72, which in the preferred embodiment are of truncated pyramidal shape, are axially shorter than the other projections 65 and 67 and therefore combine with the latter and with the similar formations on the opposite half-cage to form a plurality of radial passages 73. These passages bring the annular space located between the cage and the inner ball race into direct fluid communication with the annular space located between the cage and the outer ball race. Both of these spaces, as is known, are filled with lubricant grease.

In order to promote the flow of the lubricant grease in the bearing, and thus ensure its distribution, the portions 72 have obliquely inclined surfaces 74 arranged in flared pairs so as to diverge in axially outward directions. In order to promote the flow of the lubricant grease still further by means of the centrifugal force present during the rotation of the cage, the inclined surfaces 74 are slightly concave.

As will be appreciated, owing to the presence of the cage which also serves as a sealing element to prevent the outflow of the grease and the entry of contaminants into the bearing, it is possible to omit the two sealing shields which are conventionally provided at the sides of the bearing to seal the annular gap between the inner and outer rings of the bearing. Because of the ridges 56 and 57 formed by the half-cages, the bearing unit is advantageously constructed without any other special sealing means.

The elimination of two components yields a direct reduction in production and assembly time and costs. A further cost reduction and a saving in material and weight are achieved because the outer diameter of the inner ring is reduced to create the space required to accommodate each half-cage, particularly in the area where the mounting grooves 25 for the half-cages are formed. A corresponding reduction in material and weight is also achieved in the outer ring of the bearing, whose inside diameter is increased in the lateral areas to receive the radially outer parts of the half-cages.

The invention claimed is:

1. A cage for a ball bearing unit, the cage comprising:
a plurality of pockets each delimited by a respective spherical surface having a centre (C) lying in a radial mid-plane (P) of the bearing,
two half-cages substantially symmetrical about the mid-plane (P), and connected to one another, each half-cage having an annular body and a plurality of partially hemispherical cavities axially facing the hemispherical cavities of the opposite half-cage so as to define therewith the pockets;
mutual connecting means associated with each cage for connecting together the two half-cages; and wherein
for each half-cage, two substantially concentric and circumferentially continuous radial ridges extending radially in opposite directions from each annular body, of which the first ridge extends in a radially outward direction for sealingly engaging a groove formed in the outer ring of the bearing unit, and the second ridge extends in a radially inward direction for sealingly engaging a groove formed in the inner ring of the bearing unit.

2. The cage according to claim 1, wherein the first and second ridges extend from a respective edge projecting in an axially inward direction from a radially outer peripheral portion and a radially inner peripheral portion, respectively, of the annular body.

3. The cage according to claim 2, wherein each half-cage provides two concentric annular receptacles open towards the mid-plane (P), each bounded by a respective edge, and adapted to serve as reservoirs for lubricating grease.

4. The cage according to claim 3, wherein the annular receptacles each have a conical surface, formed by the respective edges and diverging towards the mid-plane (P).

5. The cage according to claim 2, further comprising an annular groove formed in the axially outer side of the annular body of the half-cages, the groove disposed in a radially intermediate position between the outer and inner peripheral portions.

6. The cage according to claim 1, further comprising a plurality of axial projections constituting the partially hemispheric cavities extend from the annular body of each half-cage towards the mid-plane (P), and wherein
at least some of the circumferentially consecutive projections are joined by a portion having an axial extension shorter than the adjacent axial projections the portion joins together, wherein
the shorter portions define a plurality of radial passages with the opposite half-cage.

7. The cage according to claim 6, wherein the shorter portions have surfaces inclined at an oblique angle and flared in pairs so as to diverge in axially outward directions.

8. The cage according to claim 7, wherein the inclined surfaces are concave.

9. The cage according to claim 8, wherein the shorter portions have substantially truncated pyramidal shapes.

10. The cage according to claim 1, wherein the plurality of axial projections defining the hemispherical cavities extend from one side of the annular body facing the mid-plane (P) and includes:
a first plurality of axial projections having respective concave surfaces lying in a same ideal spherical surface and substantially facing one another in pairs, and
a second plurality of axial coupling projections, circumferentially thicker than those of the first plurality of axial projections, arranged alternately with the pairs of the first axial projections, each axial coupling projection providing a partially hemispherical cavity and, on both sides of this cavity in the circumferential direction, one of the mutual connecting means or seats for mutual connection with the opposite half-cage.

11. The cage according to claim 10, wherein the mutual connecting means include axially projecting pins and wherein
the seats include corresponding recesses for snap-locking the pins.

12. The cage according to claim 11, wherein the pins are bifurcated elastically.

13. The cage according to claim 10, wherein the axial projections have axial end surfaces lying in the radial mid-plane (P) and placed in contact with similar end surfaces of the corresponding axial projections of the opposite half-cage.

14. A deep groove ball bearing unit comprising:
an outer ring with a radially inner surface providing a radially outer raceway,
an inner ring with a radially outer surface providing a radially inner raceway, and
a set of bearing balls radially interposed between the outer and the inner raceways, wherein the bearing unit includes a cage having
a plurality of pockets each delimited by a respective spherical surface having a centre (C) lying in a radial mid-plane (P) of the bearing,
two half-cages substantially symmetrical about the mid-plane (P), and connected to one another, each half-cage having an annular body and a plurality of partially hemispherical cavities axially facing the hemispherical cavities of the opposite half-cage so as to define therewith the pockets;
mutual connecting means associated with each cage for connecting together the two half-cages; and
for each half-cage, two substantially concentric and circumferentially continuous radial ridges extending radially in opposite directions from each annular body, of which the first ridge extends in a radially outward direction for sealingly engaging a groove formed in the outer ring of the bearing unit, and the second ridge extends in a radially inward direction for sealingly engaging a groove formed in the inner ring of the bearing unit, and wherein
the first radially outer ridge of each of the two half-cages is engaged in a respective circumferential groove formed in the radially inner surface of the outer ring while providing a labyrinth sealing action, and the second radially inner ridge of each of the half-cages is engaged in a respective circumferential groove formed in the radially outer surface of the inner ring while providing a labyrinth sealing action.

15. The bearing unit according to claim 14, wherein the outer ring-provides, on both sides of the raceway, a respective intermediate annular groove disposed between the raceway and the groove engaged by the half-cage.

16. The bearing unit according to claim 15, wherein the intermediate groove has a conical surface diverging in an axially outward direction.

17. The bearing unit according to claim 16, wherein the intermediate groove is axially adjacent to the conical surface of the respective edge, so as to receive lubricating grease from the respective circumferential receptacle.

\* \* \* \* \*